United States Patent Office 3,088,312
Patented May 7, 1963

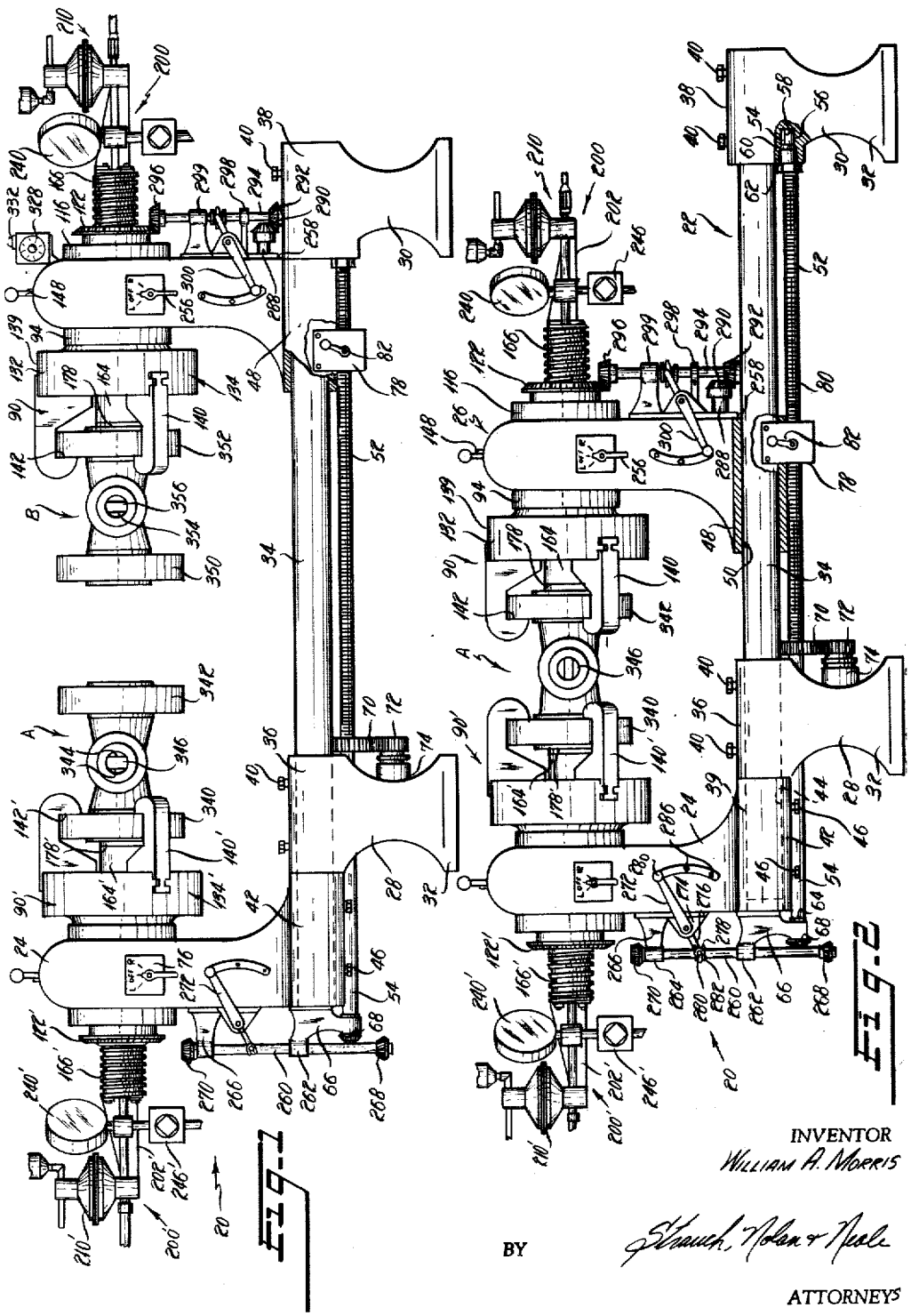

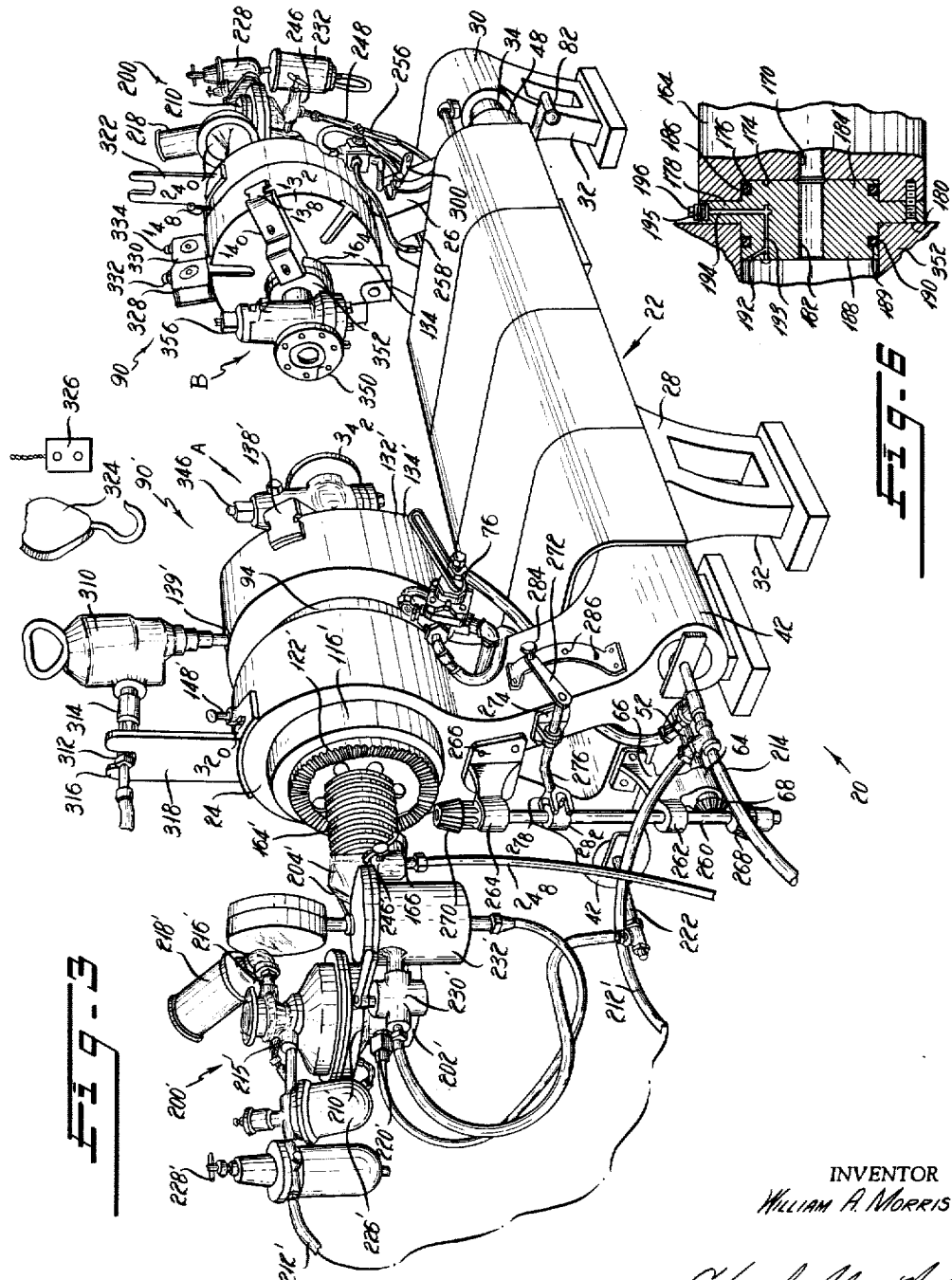

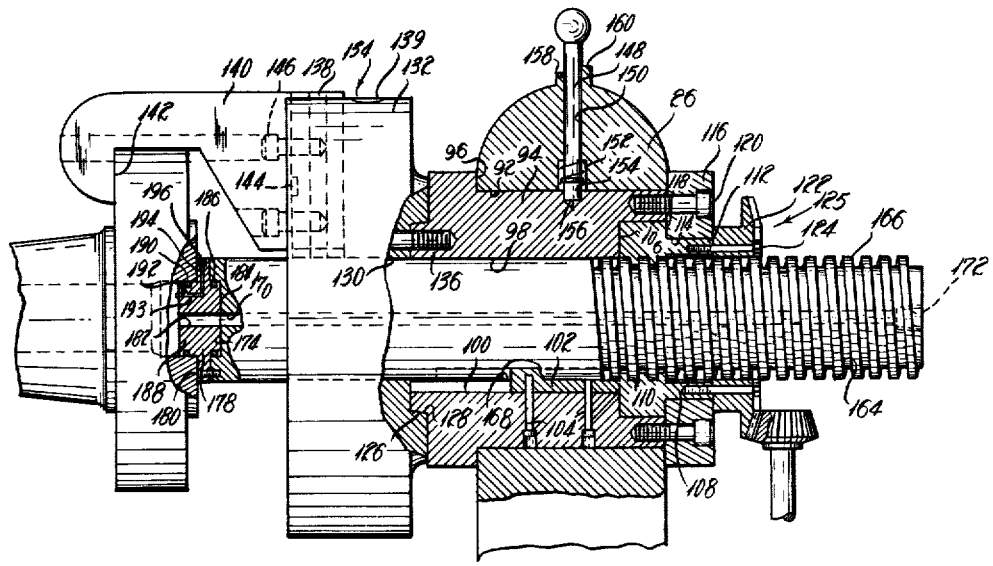

3,088,312
METHOD AND APPARATUS FOR USE IN VALVE TESTS AND ASSEMBLY
William A. Morris, Sulphur Springs, Tex., assignor to Rockwell Manufacturing Company, Pittsburgh, Pa., a corporation of Pennsylvania
Filed Mar. 1, 1957, Ser. No. 643,266
19 Claims. (Cl. 73—46)

This invention relates to a method and apparatus for use in testing valves and particularly relates to a new method of testing flanged plug valves and an apparatus for use in sequentially carrying out the various steps in the testing procedure with a minimum of time.

The method and apparatus of this invention were developed specifically for use in testing large flanged end plug valves as they are received from production but the new method and novel testing machine can readily be applied to other types of large valves, for example sliding gate or swinging gate valves.

The testing apparatus according to a preferred embodiment of this invention includes a machine with a support bed, a fixed head with a jaw chuck and a traveling head, coaxial with the fixed head, with a jaw chuck. Each head includes a reciprocable ram with apparatus for supplying fluid under controlled pressure to and through the ram. A valve to be tested is clamped in the fixed head jaw chuck and the associated ram moved into sealed engagement with the valve body port in the clamped end of the valve. A first test phase is run on the valve while so clamped. The traveling head is then driven up to, and its jaw chuck clamped on, the opposite end of the valve and the associated ram moved into sealed engagement with the associated valve body port. A second test phase is run while the valve is so clamped. The fixed head ram and jaw chuck are then released and the valve, remaining in the traveling head jaw chuck, moved away from the fixed head and a final test phase accomplished. Pressure sealing between the rams and valve body ports is accomplished by use of suitable adaptors in the ends of the rams and forces resulting from high fluid test pressures on the valves are transmitted through the valve flanges to the machine chucks and rams.

The possibility of using valve test machines utilizing hydraulic clamping against each end of the valve has been previously explored and abandoned because it has been thought that if sufficient hydraulic pressure were used against the valve ends to seal, a resultant valve body distortion would occur. For this reason such a clamped valve would not give an accurate test result of field conditions. A method of testing valves used previous to this invention requires that individual test flange connectors be bolted on each end of the valve, in proper sequence and steps, to enable observation of various valve conditions. The previous method is laborious and time consuming and only accomplishes approximately 1.5 units tested per man-hour.

The original purpose of the apparatus of this invention was for use in testing assembled valves but features are present enabling assembly of the valve in the same apparatus used for testing. Using the method and apparatus of the present invention, it is known that production and testing can be increased to at least three (3) units assembled and tested per man-hour per machine, and using two machines with a test schedule, as hereinafter disclosed, it is estimated that one operator can easily assemble and test six (6) units per hour.

Accordingly a primary object of this invention resides in a novel method of pressure testing production valves using a three stage test procedure wherein a releasable valve end clamping and port sealing process are used and includes a provision, when both ends of the valve are releasably clamped, to enable free relative floating action between the clamped ends to prevent misrepresentative test results because of valve body distortion between clamping devices such as occurred in previous proposed methods.

A further object resides in the provision of a novel continuous test procedure for pressure testing production test valves in multiple stages on one machine wherein the test time per unit is reduced and test phases on two valves can be simultaneously accomplished to enable overlapped testing of valves. By inclusion of valve assembly procedures in the same machine the man-hours per unit assembled and tested is further reduced.

Still another object resides in the provision of a novel continuous test procedure for pressure testing production test valves in multiple stages on two machines whereby test stages only or test and production steps on four valves can be simultaneously accomplished by one operator to enable overlapped testing phases on four valves.

A further primary object of this invention resides in the provision of a novel valve testing machine with provision for releasably clamping and pressure sealing the valve body inlet and outlet openings singly and concurrently.

A still further object resides in providing a novel valve assembly and testing machine with two heads, each of which includes a clamping chuck and a central ram mechanism with fluid pressurizing apparatus, whereby a valve inlet or outlet end can be clamped in a head and the associated opening engaged, sealed and pressurized by the ram mechanism, the two chucks and ram mechanisms being coaxial. In conjunction herewith one of the machine heads with its associated chuck and ram mechanism is slidable toward and away from the opposite head, chuck and ram mechanism and can be selectively power driven into position.

Another object resides in a novel valve testing machine using a fixed head and a sliding head wherein each head includes a releasable jaw chuck, a ram mechanism coaxial with the jaw chuck, provision for power driving the ram back and forth relative to the chuck, a sealing adaptor in one end of the ram to sealingly clamp against and seal a valve body opening, fluid pressure developing apparatus secured to and movable with the ram, and a passage through the ram to provide fluid communication from the pressure developing apparatus to the valve body opening.

Still another object resides in the provision of a novel adaptor sealing unit for quick assembly on the end of a standard sized ram, enabling the testing of different size valves on one machine.

Further novel features and other objects of this invention will become apparent from the following detailed description, discussion and the appended claims taken in conjunction with the accompanying drawings showing preferred structures and embodiments, in which:

FIGURE 1 is a side elevation view of a machine constructed according to the preferred embodiment of this invention and illustrates a test valve in the stationary head chuck (initial testing phase) and a second test valve in the sliding head chuck (final testing phase);

FIGURE 2 is a side elevation view of the same machine shown in FIGURE 1 and ilustrates one test valve with opposite ends clamped in the stationary head chuck and the sliding head chuck (intermediate testing phase);

FIGURE 3 is a perspective view showing the machine with a test valve clamped in each head and a speed wrench positioned in engagement wtih the stationary head chuck;

FIGURE 4 is an enlarged fragmentary view partly in section showing details of the sliding head;

FIGURE 5 is an enlarged detail view of the pressurizing pump carried by each reciprocating ram; and FIGURE 6 is an enlarged section view of a ram end sealing adaptor.

This invention relates to a method of testing valves as well as a novel machine in which the valve can be assembled and by which the method can be accomplished. Before describing the method a preferred embodiment of the machine will be described and the method will then be described with reference to the various views and components of the illustrated machine. The clutches, reciprocating rams and high pressure pump assembly are identical in the stationary and sliding machine heads, hence such components on the sliding head will be described and identical parts on the stationary head assembly will be identified using the same reference numerals with prime marks.

TEST MACHINE

With general reference to FIGURE 1, test machine 20 is a double-ended device on an elongate bed 22 with a stationary head 24 at one end of bed 22 and a sliding head 26 movable along the bed 22 toward and away from the stationary head 24. A valve which is being tested, hereinafter termed a test valve, in the machine can be independently held and subjected to a pressure test in each of heads 24 or 26 or conjointly held and subjected to a further pressure test in both of heads 24 and 26.

Bed 22 has end supports 28 and 30 with short front and rear legs 32. Parallel cylindrical tracks 34 extend horizontally through front and rear upper bosses 36 on the left hand support 28 and into respective front and rear bosses 38 on the right hand support 30. As shown by dotted lines in FIGURE 2, the left hand ends 39 of tracks 34 project a short distance from the support bosses 36. Set screws 40 in bosses 36 and 38 clamp the tracks 34 to the end supports 28 and 30 to provide a rugged, rigid bed for machine 20.

The stationary and sliding heads 24 and 26 can be made from identical castings. The lower front and rear bosses 42 on stationary head 24 are formed with holes 44 to fit over the projected ends 39 of cylindrical tracks 34 so the head bosses 42 abut support bosses 36. Stationary head 24 is securely clamped to track ends 39 by set screws 46. In the lower front and rear bosses 48 of the sliding head 26, the horizontal holes 50 extend through the bosses and are finished to a smooth sliding fit on cylindrical tracks 34 or if desired, cylindrical bushings (not shown) can be inserted in the bosses 48 for sliding engagement on tracks 34. The position of sliding head 26 is reversed from the position of stationary head 24 and its bosses 48 are placed over cylindrical tracks 34 before the righthand end support 30 is placed on and clamped to the tracks 34 by set screws 40.

A sliding head drive screw 52 is rotatably journalled in supports 28 and 30 parallel to and below the level of tracks 34 and sliding head 26. Shown in FIGURE 2, the right hand end 54 of drive screw 52 is disposed in a bushing 56 retained in a socket 58 in support 30. A split washer 60 is disposed in an annular groove adjacent drive screw end 54 and a retainer nut 62, threaded into socket 58, engages washer 60 and retains the drive screw 52 and bushing 56 in the righthand suport 30. The drive screw 52 projects through a journal bushing (not shown) in the lefthand support and extends through a journal fitting 64 in a bracket 66 fixed by screws to the end of stationary head 24. The lefthand end of drive screw shaft projects beyond the journal fitting 64 and has a bevel gear 68 nonrotatably secured thereto for a purpose to be later described.

A spur gear 70 is keyed and fixed to drive screw 52 adjacent the inner side of lefthand support 28 and is meshed with a spur gear 72 fixed to the rotatable driven shaft of a low-speed, high torque reversible motor unit 74 mounted between the legs 32 of support 28. Motor unit 74 is selectively controlled by an operator through a control 76 mounted on the side of stationary head 24 and can be any suitable type. A pneumatic motor has been used and pneumatic controls and lines are shown in FIGURE 3.

Drive screw 52 passes through a half-nut clamping assembly 78 mounted on the under side of sliding head 26. The half-nut clamp assembly 78 is well known and is used on the moving head of conventional lathe machines. Half nut clamp 78 can be engaged with or disengaged from the threads 80 of drive screws 52 by manipulation of handle 82 projecting under the front track 34. When the half-nut assembly 78 is engaged with drive screw 52, operation of the motor unit 74 will move the sliding head 26 to the left or right on tracks 34 dependent upon the operator's selected direction of motor operation through control 76.

CLUTCH AND RAM ASSEMBLIES

As previously stated the righthand clutch and ram assembly 90 is identical to the lefthand clutch and ram assembly 90′, hence only one assembly will be described; and prime reference numerals will be used to indicate the components of the stationary head clutch and ram assembly 90′ for aid in later describing the test procedure.

FIGURE 4 shows the upper end of sliding head 26 with a cylindrical through opening 92 parallel to the axis of holes 50 in the head bushings 48 and centered above the bushings. A main head bushing 94 is rotatably disposed in opening 92 and has a radial shoulder 96 engaged against one face of head 26. The bore 98 of bushing 94 has an axially directed groove 100 which receives a spline key 102 held therein by screws 104, and the right end of bushing 94 is countersunk to provide a recessed seat 106 for a ram drive nut 108 with internal threads 110. Drive nut 108 has an axially disposed end flange 112 with an inner diameter slightly greater than that of bushing bore 98 and an outer diameter less than that of the countersunk recess 106. Flange 112 is rotatably disposed through an aperture 114 in a back-up plate which coacts with the righthand face of head 26 and with a shoulder 118 on drive nut 108, and is secured to the countersunk end of the head bushing 94 by screws 120, to rotatably retain drive nut 108 in bushing recess 106. A bevel ring gear 122, with the inner ring diameter at least equal to the diameter of bushing bore 98, is fixed to the drive nut flange 112 by screws 124. Main head bushing 94 and back-up plate 116 are thus rotatably mounted in head 26 and the drive nut 108 and bevel gear 122 as a unit 125 are coaxially rotatably mounted in the end of the main bushing 94.

The shouldered end of main bushing 94 has an axially directed piloting flange 126 which is coaxial with bushing bore 98 and mates with a pilot recess 128 which is coaxial with a center bore 130 through the body 132 of a chuck 134. Chuck 134 is mounted on the end of main bushing 94, is secured thereto by screws 136 and will be rotatable with the main bushing 94. Chuck bore 130 is coaxial with and has a diameter at least equal to the diameter of bushing bore 98. Thus an axial passage is provided through chuck 134, main bushing 94 and the drive nut and gear unit 125 and the passage has a diameter throughout at least equal to the diameter of bushing bore 98. Note that key spline 102 extends into the bushing bore 98.

The working side of chuck 134 inclues three radial slides 138 equally spaced around the chuck body 132 and in a well known manner are simultaneously shiftable radially inward or outward upon insertion and rotation of a wrench member in a chuck socket 139 in a well-known manner. A horizontally extended jaw 140 with an inwardly hooked or overhanging end 142 is keyed by a lateral tongue and groove connection 144 to the face of each slide 138 and rigidly secured thereto by screws 146. Main head bushing 94, with chuck 134, is maintained in non-rotatable condition in head 26 by a plunger 148 disposed in bore 150 and biased by a spring 152 so its end 154 extends into a recess 156 in the outer cylindrical surface of bushing 94. The chuck 134 and bushing 94 can be released for rotation to enable assembly access to the top and bottom of the valve body, by pulling plunger 148 against the bias of spring 152 and rotating the plunger until a plunger stop pin 158 is positioned over a lug 160 integral with head 26 to prevent return of plunger 148 to its locking position. Note, in the locked bushing position, a chuck operating socket 139 is positioned at top center of the chuck 134 and a wrench member will be inserted vertically from above the chuck, as will be later described.

Slidably fitted through the aligned bores 98 and 130 of bushing 94 and chuck 134 respectively, is a cylindrical ram 164 with an externally threaded portion 166 at the righthand extent of the ram 164 (FIGURE 4) which engages the internal threads 110 of drive nut 108. An axially directed exterior groove 168 in the ram cylinder 164 slidably engages the key spline 102 to prevent relative rotation between the ram 164 and head bushing 94 although permitting relative reciprocatory movement. Rotation of the gear and nut assembly 125, through the threaded engagement with the non-rotatable ram 164, will move ram 164 back or forth axially in the head 26 and chuck 134 depending upon the direction of rotation of the gear and nut assembly 125. A central through passage 170 extends between the ends of ram 164, terminating at the threaded end portion 166 in a tapped opening 172. The opposite end of ram 164 has a counterbored recess 174 with a smooth finished cylindrical side surface 176.

To enable ram 164 to be used with test valves of different sizes having various diameter inlet and outlet openings, an adaptor 178 (see FIGURE 6 for details) is secured to the chuck end of ram 164 by screws 180. Adaptor 178 has a central through bore 182 coextensive with passage 170 in ram 164 and has a cylindrical portion 184 seated in the ram counterbore recess 174. The periphery of the adaptor cylindrical portion 184 is grooved to retain an O-ring seal 186 which engages and is sealingly compressed against the inner cylindrical surface 176 of ram recess 174. The free side of adaptor 178 is also shaped with a cylindrical portion 188 having an annular groove 189 retaining an O-ring seal 190. The diameter of portion 188 on different adaptors will be dimensioned to suit the diameter of the inlet and outlet openings of different sized valves being tested and provide a close free fit in the respective valve openings whereby the O-ring 190, which has a diameter slightly greater than the radial depth of its retaining groove 189, will be compressed against the inner cylindrical surface of the valve opening. The two O-rings 186 and 190 provide a highly effective high pressure seal between the ram 164, the adaptor 178 and the valve body wall around the associated opening in the valve, whereby fluid under pressure may be introduced into and retained in the test valve body through the ram passage 170, during tests.

To enable substantially complete filling of the valve with fluid prior to pressure tests, an inclined bleed passage 192 is provided in the cylindrical portion 188 near the top of the adaptor 178 and intersects with an axially directed passage 193, in turn intersecting a radial passage 194 having a tapped exterior end 195 closed by a plug 196. This bleed provision is used in the initial steps during various stages of testing a valve, the plug 196 being removed and the valve body filled with fluid until fluid flows out of the adaptor bleed passages 192, 193, 194, whereupon the plug 196 is then replaced in tapped opening 195.

*Source of fluid under pressure.*—To supply fluid under pressure to each ram, a pump, valve and indicator assembly 200 (FIGURES 1, 2, 3 and 5) is carried by each ram and has suitable connections to sources of fluid, here water and pressurized air.

A bracket 202 is mounted, through bent spaced end lugs 204 and screws 206, on the end of threaded portion 166 of ram 164 and has a horizontal section 208 serving as a mounting platform for a high pressure fluid pump 210. The illustrated pump is a diaphragm type pneumatically operated high pressure fluid pump with an air supply inlet line 212 from a pressurized air supply manifold 214 connected to pump inlet 215. Pump diaphragm exhaust communicates through fitting 216 to a muffler 218, thence to atmosphere. Fluid is supplied to pump 210 through inlet line fitting 220 connected to a fluid supply manifold 222.

Suitable control components such as an inlet cock (not shown), liquid trap 226 and pneumatic pressure control valve 228 (FIGURE 3) are included in the supply connection between the pump 210 and the air supply manifold 214, and an inlet cock 230 and liquid filter 232 are preferably included in the connection between pump 210 and the fluid supply manifold 222.

A short pipe 236 is connected at one end to the fluid outlet of high pressure pump 210 and provides fluid communication to a four-way fitting 238. A high pressure indicator 240 is connected to one outlet of fitting 238, a short nipple 242 is connected between a second outlet of fitting 238 and tapped opening 172 in ram 164 and provides fluid communication to ram passage 170, and a second nipple 244 is connected between the third outlet of fitting 238 and a high pressure valve 246 provides a controlled fluid communication path to a drain line 248 connected to the outlet side of high pressure valve 246.

A tap is provided from the pneumatic inlet line to a selective pneumatic motor control 256 mounted on the sliding head 26 in a manner similar to control 76 on the stationary head. Control 256 is connected to a reversible pneumatic motor 258 mounted in the base of sliding head 26 and enables selective control of motor 258 in either direction and to a neutral or off condition.

Independent powered drive of rams 164 and 164' is provided and the two drive mechanisms, although functioning in a similar manner, are of different construction because of the movability of sliding head 26 as compared with stationary head 24.

To drive the ram 164' of stationary head 24, a vertical drive shaft 260 is mounted for rotation and axial reciprocation through an upper collar 262 of the aforementioned lower bracket 66 and through a collar 264 of an upper bracket 266 fixed on head 24. Bevel gears 268 and 270 are non-rotatably fixed on the lower and upper ends, respectively, of shaft 260 and are so disposed that an upward shift of shaft 260 will simultaneously move lower bevel gear 268 into meshed engagement with the bevel gear 68 fixed on the end of drive screw 52 and move upper bevel gear 270 into meshed engagement with the ring bevel gear 122' fixed to the drive nut for ram 164'. Suitable bushings (not shown) are provided in collars 262 and 264.

A hand lever 272, pivotally mounted in a bracket 274 fixed to head 24 has an extension arm 276 with an end yoke 278 coupling to a trunnion collar 280 rotatable on drive shaft 260 between two collars 282 rigidly fixed on the drive shaft. The knob 284 on hand lever 272 has a pin end (not shown) and is spring loaded to bias the pin end into one of recesses 286 in the head 26. Thus when lever 272 is moved down to shift the drive shaft 260 to engage the drive gears 268 with gear 68 and gear 270 with gear 122', the pin on knob 284 can move under spring bias into a recess 286 and hold the drive in engagement. With the drive in engagement, selective operation of control 76 on the stationary head 24 will cause motor 74 to operate and drive ram 164' in the desired direction. Note, if half nut clamp 78 is engaged with the drive screw 52 while motor 74 is operated, the sliding head 26 will be shifted in the same direction as the ram 164' because the threads of drive screw 52 and ram 164' are in the same direction, both being righthand in the illustrated embodiment.

Because of the movement of sliding head 26 relative to drive screw 52, the drive for the sliding head ram 164 cannot conveniently be taken off of the drive screw, hence the provision of a second motor 258 and control 256 which, as previously described, are mounted directly on the sliding head 24. Shaft 288 of motor 258 extends to the right, under the ram nut ring bevel gear 122 and has fixed thereto a bevel gear 290 which is enabled to mesh with a lower bevel gear 292 on drive shaft 294. Bevel gear 296 on the upper end of shaft 294 is enabled to mesh with ram nut ring bevel gear 122. Drive shaft 294 is rotatably and reciprocably mounted in brackets 298 and 299 which are secured on the sliding head 26. An operating hand lever 300 is operatively coupled to shaft 294 to raise and lower the shaft to engage or disengage the drive from motor 258 to ram nut bevel gear 122 and to maintain the drive in engagement. When the drive is engaged, suitable operation of control 256 will cause operation of motor 258 to move ram 164 to the left or right.

Referring to FIGURE 3, a powered speed wrench 310 is shown inserted in the top chuck socket 139 with an extension 312 of its handle 314 resting in the fork 316 of a heavy bracket 318 secured by screws 320 in the stationary head 24. This enables the speed wrench to be operated without strain on the operator. A similar forked bracket 322 is secured on the sliding head 26 and receives the speed wrench handle extension 312 whenever the speed wrench 310 is shifted to the sliding head 26 of clutch 134 during the test procedure.

Also illustrated in FIGURE 3 is a hoisting hook 324 and the control switch 326 of an overhead electric hoist used to install and remove the heavy test valves or valve components in and from tthe chucks 134 and 134'. Electric timers 328 and 330 with respective indicating lights 332 and 334 are mounted on the sliding head 26 for convenience and are used in the testing procedure as will be described hereinafter. The indicating lights 332 and 334 can, if desired, be replaced by audio signal devices.

Referring to FIGURES 1 and 3, a test valve A is shown positioned for the first test stage with its left hand mounting flange 340 clamped in the stationary head chuck jaws 140' and its righthand flange 342 free. Ram 164' is forced against the left side of valve A moving its adaptor into sealing engagement within the lefthand valve body opening and forcing test valve A tightly against the chuck jaw hook ends 142. The ported plug of tool valve A is closed as indicated by the flats 344 on plug stem 346. Note that a rigid connection exists between the pressure pump 210' and the lefthand valve flange 340 affording minimum opportunity for leakage of fluid and pressure applied to the test valve. Also the only force acting on the test valve A to resist the forces developed within the valve body by the pressurized fluid is through the clamped flange 340, thereby providing a true test result of field conditions.

Still referring to FIGURES 1 and 3, a second test valve B, positioned for the third test stage, is shown with its lefthand mounting flange 350 free and its righthand mounting flange 352 clamped in the sliding head chuck jaws 140. Ram 164 has been driven against the right side of test valve B, moving its adaptor into sealing engagement within the righthand valve body opening and forcing the test valve B tightly against chuck jaw hook ends 142. The ported plug of test valve B is closed as indicated by the flats 354 on plug stem 356. A rigid connection between pressure pump 210 and the righthand flange 352 exists in this sliding head installation in the same manner as in the stationary head installation, and for this reason the sliding head 26 can ride free on tracks 34 during actual valve testing and the clamping and ram sealing are unaffected. Here also, the only force acting on the test valve B to resist the forces developed in the valve body by the pressurized fluid is through the flange 352, thereby providing true field condition testing.

FIGURE 3 shows the machine with test valve A positioned for the second test stage. The stationary head chuck 134' and ram remain as in FIGURE 1, but the sliding head 26 has been moved to the left until its chuck jaws 140 can clamp around the righthand flange 342 of test valve A and the sliding head ram 164 driven into sealed engagement with the righthand valve body opening with the sliding head drive nut 78 disengaged. This enables the ram 164 to back the sliding head 26 to the right until the chuck jaw hooks 142 tightly clamp the flange 342 and ram in sealed position. The sliding head 26 remains disengaged from its drive screw 52 while fluid under pressure is applied to test valve A with its ported plug open as indicated by stem 346, to enable only one end of the test valve A to be held stationary while the opposite end can float relative to the fixed end thereby permitting true valve body distortion as in actual field conditions.

Test valve A is then released from the stationary head chuck and, through movement of sliding head 26, moves to the position shown by test valve B in FIGURES 1 and 3 as will now be more fully described in connection with single and dual machine test procedures which follow.

METHOD OF TESTING VALVES

The afore-described apparatus is used for accomplishing a testing procedure on assembled valves with as little time and effort expended outside of time periods necessary for accomplishing actual pressure tests. The function of the test apparatus is to hold the valve and to seal off the necessary end and/or ends without affecting any expansion or contraction, foreign to that which might occur during field use of the valve, during conditions simulated in the various tests. The apparatus is so constructed to enable valves to be assembled and tested in the same machine so one operator, utilizing two machines can alternate between the two machines, performing assembly steps in one and testing steps in the other to easily attain an average assembly and test rate of 6 valves per hour.

Under desired production standards, various tests must be performed on an assembled valve before it is considered acceptable for sale. It is desirable that one step in testing be to apply about twice the rated pressure for about five minutes to one side of the valve with the valve plug (closure) closing off the port. During this step the opposite end of the valve passage must be open so that the tester (operator) can inspect the opposite end of the valve for any leakage or failures which may occur around the plug. A further desired step is to apply fluid under pressure to the opposite end of the valve with the tester making the same inspection for leakage. The valve then must be given body and operational tests wherein the tester closes off both ends of the valve and with the plug in open posiion applies about twice the rated pressure to fluid in the valve body making an inspection for leaks around the bottom or cover end, and the top or plug stem end, and for failures in the seals of these components. Then the pressure is unbalanced from one end and from the other end while the plug is operated to check the operational characteristics under simulated field conditions. It is desired that each of the three tests be run for at least a five minute duration.

The three phases or tests are present in the test procedure of the present method, however, the first and the last phases are end leakage tests with the plug closed while the intermediate test phase consists of the body and operational leakage test. Set forth below are the various steps included in each of the three test phases of this procedure, explained in conjunction with the aforedescribed apparatus.

I. *First Phase*

(1) Load a test valve in stationary head chuck 134'—position valve and close jaws 140'.

(2) Engage the drive to stationary head ram 164' and drive the ram in to clamp against valve.

(3) Fill valve with water.

(4) Close overflow plug 196' in adaptor 178'.

(5) Set fluid pump 210' to desired pressure.

(6) Set timer 328 for a 5 minute test duration.

(7) Blow out (with a compressed air source) excess water from free end of test valve and make a preliminary leakage inspection of valve plug.

(8) At the end of 5 minute test make final leakage inspection.

II. *Second Phase*

(1) Clamp half-nut assembly 78 and run sliding head 26 up to test valve.

(2) Close chuck jaws 140 of sliding head 26 on valve flange.

(3) Release clamped half-nut assembly 78 and permit sliding head 26 to float.

(4) Drive in sliding head ram 164 to engage valve port and cause sliding head 26 to float back until chuck jaws 140 firmly clamp valve flange.

(5) Open overflow plug 196 in sliding head ram adaptor 178.

(6) Open plug in test valve-allow entire valve to fill-reset pump 210' to desired pressure.

(7) When valve is full, close adaptor overflow plug 196.

(8) Set timer 328 for 5 minute test duration.

(9) Blow any excess water from around top and bottom of test valve and make preliminary inspection for leaks.

(10) At end of 5 minute test period, make final check for top and bottom leakage.

(11) Manipulate pumps 210 and 210' on both rams, and relief valves 246 and 246' to give the test valve proper operation test, including valve plug operation.

III. *Third Phase*

(1) Close the relief valve 246 on sliding head pump assembly and the test valve plug.

(2) Open water valve on sliding head assembly 200 and set sliding head pump 210 to proper pressure for plug seat test.

(3) Open relief valve 246, turn off pump 210 and shut water valve on the stationary head assembly 200.

(4) Retract stationary head ram 164.

(5) Open stationary head chuck jaws 140.

(6) Clamp half-nut assembly 78 on sliding head drive and back the sliding head 26 to far end of machine 20.

(7) Set timer 328 for 5 minute test duration.

(8) Blow out excess water from open end of test valve and make preliminary leakage inspection.

(9) At end of 5 minute test make final leakage inspection.

(10) Open relief valve 246, shut-off pump 210, shut off water valve on sliding head assembly 200.

(11) Open plug in test valve.

(12) Secure hoist to the test valve.

(13) Open sliding head chuck jaws 164.

(14) Remove valve to a "finish" skid or bin.

The above three test procedural phases can be carried out in sequence on one machine. Testing of several valves on one machine can be overlapped by initiating the first phase (I) on another test valve during the five minute pressure test in the third phase (III) on the first test valve. In this procedure a second timer (not shown) is used.

When two machines are provided for use in testing a plurality of the valves by one operator, the above three test phases are accomplished on each machine with the first phase test (I) on machine No. 2 being initiated and occurring during the five minute pressure test between steps 7 and 8 in the first test phase (I) on machine No. 1. By the time the first phase (I) on machine No. 1 is finished the operator will have started the 5 minute test run of the first phase (I) on machine No. 2 and during this 5 minutes returns to machine No. 1 and carries out the steps in the second test phase (II) up to step No. 10 which starts a five minute valve body test on machine No. 1. During this five minute test period the operator returns to machine No. 2 and sets up the second test phase (II) on that machine. During the five minute test period on machine No. 2 during the second test phase (II) the operator returns to the first machine and completes step 11 in the test phase II and sets machine No. 1 for the third test phase (III). During this time the operator also loads another test valve in the stationary head in the first machine and initiates a new test phase I. When test No. 1 is again underway on the first machine the operator can return to machine No. 2 and carry out the third test phase (III), placing a new test valve in the stationary head of machine No. 2 and again start test phase I on that valve. The overlapped testing of multiple valves can be carried on smoothly and efficiently with maximum utilization of an operator's time.

A test procedure for two machines is noted in brief outline below, using the same symbols for test phases and test steps as noted in the single valve test procedure above.

TWO MACHINE MULTIPLE VALVE TEST PROCEDURE

| Machine No. 1 | Machine No. 2 |
| --- | --- |
| Phase I (Valve #1): Steps 1-7 (5 minute pressure test); Step 8. | (No valve in machine.) |
| Phase II (Valve #1): Steps 1-9 (5 minute pressure test); Steps 10 and 11. | Phase I (Valve #2): Steps 1-7 (5 minute pressure test); Step 8. |
| Phase III (Valve #1): Steps 1-8. | Phase II (Valve #2): Steps 1-9 (5 minute pressure test); Steps 10 and 11. |
| Phase I (Valve #3): Steps 1-7 (5 minute pressure test on Phase III and Phase I overlap); Step 8 (can wait). | Phase III (Valve #2): Steps 1-8. |
| Phase III (Valve #1): Steps 9-14. | Phase I (Valve #4): Steps 1-7 (5 minute pressure tests on Phase III and Phase I overlap); Step 8 (can wait). |
| Phase II (Valve #3): Steps 1-9 (5 minute pressure test). | Phase III (Valve #2): Steps 9-14. |

NOTE.—One speed wrench can be used between the two machines.

For clarity of disclosure the following description of a test cycle on one machine is given to show exactly what happens and what must be done.

The tester gets a valve from a skid coming from the production line and, using an overhead hoist, delivers it to the stationary head on the test machine. He positions the test valve in the stationary head three jaw chuck and, by using a speed wrench, closes the jaws of the chuck over the flange on one end of the valve body. He then actuates the stationary head ram to drive the adaptor with its O-ring seal into the bore of the valve flange, sealing off the valve opening. At this stage in the procedure, the plug in the valve is in open position and, to save time, the tester begins to fill the valve with water using a waste piece of gasket material to close off all but the extreme top of the open end of the valve. When the water begins to overflow the extreme top of the gasket, the plug in the valve is closed and pressure is built up within the valve by use of the pump assembly mounted on the end of the stationary head ram. This is a quick, convenient manner of filling the valve with water although the bleed provision in the ram adaptor can be used to enable filling the valve with water while the valve plug is closed. Using the pump to build up pressure to a prescribed value, the tester blows out any moisture remaining in the open end of the valve with a compressed air hose, and makes a visual inspection through the open valve end to determine if the valve plug permits any leakage.

Upon satisfactory completion of this first valve plug test from one end, the tester will engage the half nut clamp assembly on the sliding head of the machine to move the sliding head forward against the other valve flange. Again by use of the speed wrench, this time on the sliding head chuck, he closes the jaws of the chuck around the other flange of the valve, then disengages the half nut clamp assembly, allowing the sliding head to float upon the bed of the machine. At this stage he drives in the second ram, closing off the other end of the valve by the second ram adaptor and drawing the chuck jaws back tight against the second flanged end of the valve. It has been noted that the half nut clamp assembly remains disengaged at this stage, therefore the sliding head is free to float with any normal expansion or contraction that the valve body may undergo during this second test phase. Now the valve plug is turned to open position and the adaptor bleed plug is removed to permit air to escape while the valve and sliding head ram passages are being filled with water. When water begins to overflow through the bleed hole the adaptor plug is replaced and pressure again applied to the valve body between the two rams. The tester makes visual checks of the valve cover and plug stem ends for signs of leakage. After five minutes of this test, the body test is complete and an operational test is run. The operational test consists of closing the valve under pressure from the pumps. The relief valve on one side of the machine is open to unbalance the pressure and the test valve is operated. The relief valve is then closed and the opposite relief valve opened which unbalances the force in the opposite direction. The tester again operates the valve. This completes the operational test.

At this point the valve is still under pressure from the pump on the sliding head ram and the test valve plug is closed. All water cocks and air controls to the pump on the stationary head of the machine are closed. The flanged end in the stationary head is now completely disengaged from the valve by retracting the stationary head ram and opening the chuck jaws. The half nut clamp assembly is engaged on the sliding head drive screw and the sliding head moved to the opposite end of the machine. The operator now initiates the third test which tests plug seating and sealing from the end of the valve opposite to that tested in the first test. During this final plug test, if desired, the operator can load the next valve in the stationary head and prepare for the first test on that valve. Upon completion of the third pressure plug test the operator shuts the appropriate water cocks and air valves, retracts the sliding head ram, attaches the hoist to the valve, removes the sliding head chuck jaws from around the flanged end of the valve and thus completes the testing of one valve.

This test procedure has been described as being carried out on assembled valves which are obtained from a production line. As operators become experienced in the test phases of this testing procedure, these machines may also be used to assemble the various valve components and the test stages can be immediately performed on the valve without removing the valve from the machine. In this way the assembled valve is immediately tested and placed in a finished condition. Rather than receive an assembled valve from a skid the operator receives a valve body, placing one end flange in the stationary head chuck jaws, clamping the jaws and running the stationary head ram into sealing engagement with the opening into the clamp flanged end. At this point the valve would be ready for test except for the port closure plug, cover, packing gland and other components necessary for a completely assembled valve. By releasing the plunger lock on the stationary head main bushing, the clamped valve body may be rotated to enable insertion of a plug from one side. At the same time the bottom cover with its seal or gasket can be assembled and bolted to the valve body. The chuck can then be swung around so the stem end of the valve plug is accessible to the machine operator. Packing gland, gland adapters and gland seal cartridges as required can be assembled over the stem, secured and torqued to proper values. In lubricated valve assemblies a lubricating fitting can be inserted into the valve stem and proper lubricant applied to the plug seat. At this point the valve is assembled and ready for testing. The assembled valve remains in the chuck and is already pressure sealed by the stationary head ram. It can remain in the horizontal position or the entire chuck and clamped valve can be rotated to and locked in a vertical position by the main bushing plunger.

The foregoing description and discussion discloses apparatus and procedure for performing tests and/or assembling valves with the minimum elapsed time and labor. The test phases of this procedure are so arranged as to permit overlapping of the test procedure steps when it is desired to test a multiple number of valves. Procedure is so arranged to permit one operator to attend the testing of multiple valves in one or two machines to increase the output of assembled and tested valves at least four times that which has been previously considered a standard production rate. Several features of the apparatus utilized to accelerate valve assembly and testing operations are the special overhanging hook jaws on the three jaw chucks used in stationary and sliding valve clamping and sealing heads. The reciprocable ram passing axially through the clamping chuck, together with the chuck, acts in a manner similar to a nut and bolt to provide the holding force for counteracting the test pressures applied within the valve body. O-ring equipped adaptors in the ends of the reciprocating rams permit the use of a standard ram with different sized flanged end valves being tested. The special bracket on top of each of the stationary and sliding heads permit alternate use of a single speed wrench in cooperation with the brackets on each head for easing the exertion necessary on the part of the tester. The sliding head with the associated pressure ram permits quick changing of the clamping, sealed valve arrangement from one end of the valve to another. The half nut clamp arrangement on the sliding head drive screw provides an advantage of a floating head which, as has been adequately explained, compensates for any valve body expansion or contraction which might occur during the performance of the various pressure tests.

While the fluid used to subject the interior of the valve to test pressure is usually water because it is inexpensive and always available, any other incompressible fluid or liquid is equally usable.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent Is:

1. A valve testing machine comprising: a support; a fixed head at one end of said support; a shiftable head mounted on said support movable toward and away from said fixed head; selectively operable power means for moving said shiftable head; a jaw chuck with a coaxial reciprocable ram carried by each head; independent selectively operable means for reciprocating each ram relative to its associated chuck; and independent means for developing and applying fluid under pressure through each ram operatively connected to each ram.

2. A valve testing machine comprising: a support; a first means, fixedly mounted adjacent one end of said support, for clamping an end flange and sealing against an end opening of a flanged valve body; a second means, reciprocably mounted on said support to move toward and away from said first means, for clamping the other end flange and sealing against the other end opening of a flanged valve body both independently of or simultaneously with clamping and sealing by said first means including means enabling floating of said second means relative to said first means; and means operatively connected with each of said first and second means providing a source of and communication for fluid under pressure into the clamped and sealed ends of the valve.

3. A valve testing machine comprising: a support; a first head fixed adjacent one end of said support; a second head reciprocably mounted on said support for movement toward and away from said fixed head; power means selectively engageable with said second head to move said second head in either direction or permit free floating of said second head relative to said first head; each head including an overhanging jaw chuck with a coaxial ram reciprocably mounted therein: each ram having an axially disposed passage means providing fluid communication from one end to the other end; an adaptor insert in one end of each ram adapted to provide a sealed pressure connection with the end opening of a valve held in the jaws of said chuck; a high pressure pumping assembly mounted on the opposite end of each ram with an inlet adapted to be connected with a fluid source and an outlet in fluid communication with said ram passage means.

4. A valve testing machine comprising: a base; a head on said base having a through bore; an axially apertured adjustable jaw chuck; means securing said jaw chuck to one side of said head with the aperture of the chuck in substantial coaxial alignment with said bore in said head; a cylindrical ram projecting through the bore in said head and at least partially through the apertured chuck and having axially directed through passage means; means for axially moving and axially maintaining the position of said ram relative to said chuck; means carried by the end of said ram adjacent said chuck adapted for sealing engagement with a valve opening of a flow when clamped in said chuck to provide a pressure tight fluid communication between the ram passage means and said valve; fluid pressure developing means having a pressure tight fluid communication with said ram passage means; means rotatably mounted in said head axially securing said chuck to said head for rotational positioning of said chuck; and means on said head releasably securing said rotatable means against rotation.

5. A compact fluid pressure system for use in combination with a reciprocable ram in a valve testing machine wherein the ram has a fluid passage therethrough and is adapted to engage and clamp the end of a test valve adjacent a test valve body opening, comprising: a high pressure fluid pumping device with control means, an inlet for connection to a fluid source and an outlet; a multiple outlet means with a fluid communication connection to said pump device outlet, a pressure indicator connected to said multiple outlet means; fluid communication means between said multiple outlet means and said ram fluid passage; a high pressure control valve with an inlet connected to said multiple outlet means; an outlet adapted to be connected to a drain line; a support rigidly secured to said reciprocable ram; and means mounting said pump, said multiple outlet means and said pressure indicator on said support.

6. Apparatus for testing leakage in a valve of the type having an open ended through body passage adapted to be closed by an intermediate valve element movable to block the passage within the body comprising: a support having means for clamping the valve body adjacent an open end of said passage, a plug on said support shaped and sized to interfit with and seal said passage end fluid tight, a ram on said support supporting said plug, means for shifting the ram for establishing and maintaining said plug in tight axial assembly with the valve body, and means connected to said ram and associated with a conduit through the ram and plug for introducing fluid under pressure into the valve passage and maintaining a desired internal fluid pressure within said valve passage during a predetermined inspection period.

7. In the apparatus defined in claim 6, said plug being removably mounted on the adjacent end of said ram which is formed to receive one end of any of a plurality of different plugs having different valve passage fitting portions.

8. In the apparatus defined in claim 6, said support comprising a head, a member rotatable on the head, means for holding said member in a predetermined position of rotation on said head, and means mounting said ram for reciprocation on and through said member.

9. In the apparatus defined in claim 6, lockable adjusting means on said support whereby said valve clamping means may alternatively be rotated to position the valve for assembly purposes, or locked in a predetermined position for said leakage test.

10. A method of testing valves comprising the steps of: releasably clamping one end connection of a test valve in a first clamp device; sealingly applying a means for supplying a fluid pressure source to the valve body opening in the clamped end; filling the body of the valve between said clamped end of the valve and the valve plug with fluid; with the plug of said valve in a closed position, applying a predetermined pressure from the fluid pressure supply source to the fluid in said clamped end of the valve for a predetermined time period; inspecting for leakage at the free end of said valve while pressure is applied; releasably clamping the other end of said test valve in a second clamp device with relative floating movement respective to said one end of the test valve; sealingly applying a second means for supplying a fluid under pressure to the opening in said other clamped end; opening the plug in said test valve and filling the entire valve with fluid; applying pressure on the fluid in said valve; inspecting for valve body leakage; removing the releasable clamping means and the means for supplying pressure from the said one end of said test valve; with the valve plug in closed position, applying a predetermined pressure on fluid in the opposite end of said valve through said second fluid pressure supply means for a predetermined time; and inspecting for leakage at the free end of said test valve.

11. A method of assembling and testing valves comprising the steps of: releasably clamping one end connection of a finished valve body in a first clamp device; sealingly applying a means for supplying a fluid pressure source to the valve body opening in the clamped end; assembling the valve port closure and associated components such as operating stem packing glands and sealed covers to said valve body; without removing the valve body from its clamped position, filling the body of the valve between said clamped end of the valve and the valve closure means with fluid; with the valve closure means in a closed position, applying a predetermined pressure from the fluid pressure supply source to the fluid in said clamped end of the valve for a predetermined time period; inspecting for leakage at the free end of said valve while pressure is applied; releasably clamping the other end of said test valve in a second clamp device with relative floating movement respective to said one end of the test valve; slightly applying a second means for supplying fluid under pressure to the opening in said other clamped end of the test valve; opening the closure means in said test valve and filling the entire valve with fluid; applying pressure on the fluid in said valve; operating the closure and inspecting for valve body leakage; removing the releasable clamping means and the means for supplying pressure from said one end of said test valve; with the valve closure means in closed position, applying a predetermined pressure on fluid in the opposite end of the test valve through the second fluid pressure supply means for a predetermined time; and inspecting for leakage at the free end of the test valve.

12. A method of overlapped testing of valves comprising the steps of: releasably clamping one end connection of a test valve in a first clamp device; sealingly applying a first means for supplying a fluid pressure source to the test valve body opening in the clamped end; filling the body of the test valve between the clamped end of the test valve and the test valve plug with fluid; with the plug of the test valve in closed position, applying a predetermined pressure from the fluid pressure supply source to the fluid in the clamped end of the test valve for a predetermined time period; inspecting for leakage at the free end of the test valve while pressure is applied; releasably clamping the other end of said test valve in a second clamp device which has relative floating movement respective to the one end of the test valve; sealingly applying a second means for supplying a fluid under pressure to the opening in the end of said other clamped end; opening the plug in the test valve and filling the entire test valve with fluid; applying pressure on the fluid in the test valve; operating the test valve plug and inspecting for valve body leakage; removing the first releasable clamping device and the means for supplying pressure from said one end of the test valve; with the valve plug in closed position, applying a predetermined pressure on the fluid in the opposite end of the test valve through the second pressure supply means for a predetermined time; during said last mentioned predetermined time, releasably clamping one end connection of a next test valve in the first clamping device; sealingly applying the first means for supplying a fluid pressure source to the next test valve body opening in the clamped end; filling the body of the next test valve between said clamped end and the next test valve plug with fluid; with the plug of the next valve in a closed position, applying a predetermined pressure from the first fluid pressure supply source to the fluid in said clamped end of the valve for a predetermined time period; inspecting for leakage at the free end of the next test valve while the pressure is applied; during the last predetermined time period pressure test on the first test valve and during the first predetermined time period pressure test on the next test valve, making inspections for leakage at the free end of said first test valve; and during the first predetermined time period pressure test on the next test valve, releasing the fluid pressure, the sealing means and the clamping means from the first test valve and removing the first test valve from the second clamp; and thereafter repeating the above steps and overlapped arrangement on successive test valves.

13. A compact fluid pressure system for use in combination with a reciprocable ram in a valve testing machine wherein the ram has a fluid passage therethrough and is adapted to engage and clamp the end of the piston valve adjacent the test valve body opening, comprising: a high pressure, fluid operated, fluid pumping device with a control means, an inlet for connection to a fluid source and an outlet; a multiple outlet, manifold block with a fluid communication connection to said pump device outlet; a pressure indicator connected to an outlet of said multiple outlet block; fluid communication means between a second outlet of said multiple outlet block and said ram fluid passage; a high pressure control valve with an inlet connected to a third outlet of said multiple outlet means and an outlet adapted to be connected to a drain line; and means mounting said pumping device, multiple outlet block, pressure indicator and high pressure control valve in a closely grouped assembly.

14. A valve testing machine comprising: a base; a head on said base; an axially apertured jaw chuck secured to one side of said head; a cylindrical ram projecting through said head and through the apertured chuck having axially directed through passage means; means for moving and holding said ram relative to said chuck comprising an internally threaded nut rotatably mounted in said head coaxial with said ram and in threaded engagement with the external threads on said ram, and a reversible drive means selectively operable to rotate said nut in a desired direction for ram reciprocatory movement; means carried by the end of said ram adjacent said chuck adapted for sealing engagement with a valve opening of a valve when clamped in said chuck to provide a pressure tight fluid communication between the ram passage means and said valve; and fluid pressure developing means having a pressure tight fluid communication with said ram passage means.

15. A valve testing machine comprising: a base; a head on said base; an axially apertured jaw chuck secured to one side of said head; a cylindrical ram projecting through said head and through the apertured chuck having axially directed through passage means constituted by an axial bore; and the end of said ram adjacent said chuck is provided with a counterbored recess; means for moving and holding said ram relative to said chuck; means carried by the end of said ram adjacent said chuck adapted for sealing engagement with a valve opening of a valve when clamped in said chuck to provide a pressure tight fluid communication between the ram passage means and said valve, comprising an adaptor insert with cylindrical end portions and an axial through bore, one of said cylindrical end portions being disposed in said counterbored recess, an O-ring seal disposed between said one cylindrical end portion and said counterbored recess, an annular groove in the cylindrical surface of the other of said cylindrical end portions, and an O-ring seal disposed in said annular groove; and fluid pressure developing means having a pressure tight fluid communication with said ram passage means.

16. A valve testing machine as defined in claim 15, wherein said adaptor insert includes a radial flange between said cylindrical end portions and includes a bleed passage leading from the top of the end of said other cylindrical end portion through and to the exterior of said radial flange, and means to shut off communication through said bleed passage.

17. A head for use in combination with a valve testing machine comprising: an apertured body; a rotatable sleeve means axially fixed in the aperture of said body; selectively operable releasable means provided in said body to lock said sleeve means against rotation; a multiple jaw chuck, secured to one end of said sleeve means, including a central opening coaxial with the body aperture and having an overhanging hook end on each jaw to enable the flange end of a valve body to be clamped in said chuck; a ram projected coaxially through the body aperture and said central opening adapted to sealingly engage around the body opening in the flanged end of a valve body clamped in said chuck; means provided to permit reciprocation and prevent rotation of said ram in said sleeve, whereby the flanged end of a valve in said chuck is axially clamped between said ram and said overhanging hook ends of said chuck jaws, said means comprising an internally threaded nut coaxially rotatably secured against axial movement relative to said sleeve in the other end of said sleeve, and external threads on the outer surface of said ram matching and engaged by the threads on said nut whereby rotation of said nut will reciprocate said ram; and means for introducing fluid under pressure through said ram into the opening of the clamped end of a valve body.

18. A head as defined in claim 17, wherein a ring gear is coaxially rigidly secured to said nut; and the means for moving said ram includes a selectively reversible power drive means having a gear transmission journalled on said body and actuable to drivingly mesh with said ring gear.

19. A head as defined in claim 18, wherein said body includes means for reciprocable attachment to guide tracks of the valve testing machine; means for releasable connection to a machine power drive for reciprocation on the guide tracks; and said power drive means includes a motor means and controls therefor carried by said body and operatively associated with said gear transmission.

References Cited in the file of this patent

UNITED STATES PATENTS

| 1,298,236 | McKenzie | Mar. 25, 1919 |
| 2,017,393 | Boax et al. | Oct. 15, 1935 |
| 2,091,323 | Kruse | Aug. 31, 1937 |
| 2,242,658 | Protin | May 20, 1941 |
| 2,483,662 | Niederhiser | Oct. 4, 1949 |

FOREIGN PATENTS

| 70,938 | Norway | Sept. 2, 1946 |

UNITED STATES PATENT OFFICE
CERTIFICATE OF CORRECTION

May 7, 1963

Patent No. 3,088,312

William A. Morris

It is hereby certified that error appears in the above numbered patent requiring correction and that the said Letters Patent should read as corrected below.

Column 4, line 4, for "suport" read -- support --; column 5, line 7, for "inclues" read -- includes --; column 7, line 51, for "tthe" read -- the --; column 13, line 27, for "therein:" read -- therein; --; line 47, for "valve opening of a flow" read -- flow opening of a valve --; column 14, line 71, for "slightly" read -- sealingly --.

Signed and sealed this 24th day of December 1963.

(SEAL)
Attest:

ERNEST W. SWIDER
Attesting Officer

EDWIN L. REYNOLDS
Acting Commissioner of Patents